J. E. HOSMER.
GRAVITY HAND CULTIVATOR.
APPLICATION FILED OCT. 22, 1908.
933,986.
Patented Sept. 14, 1909.
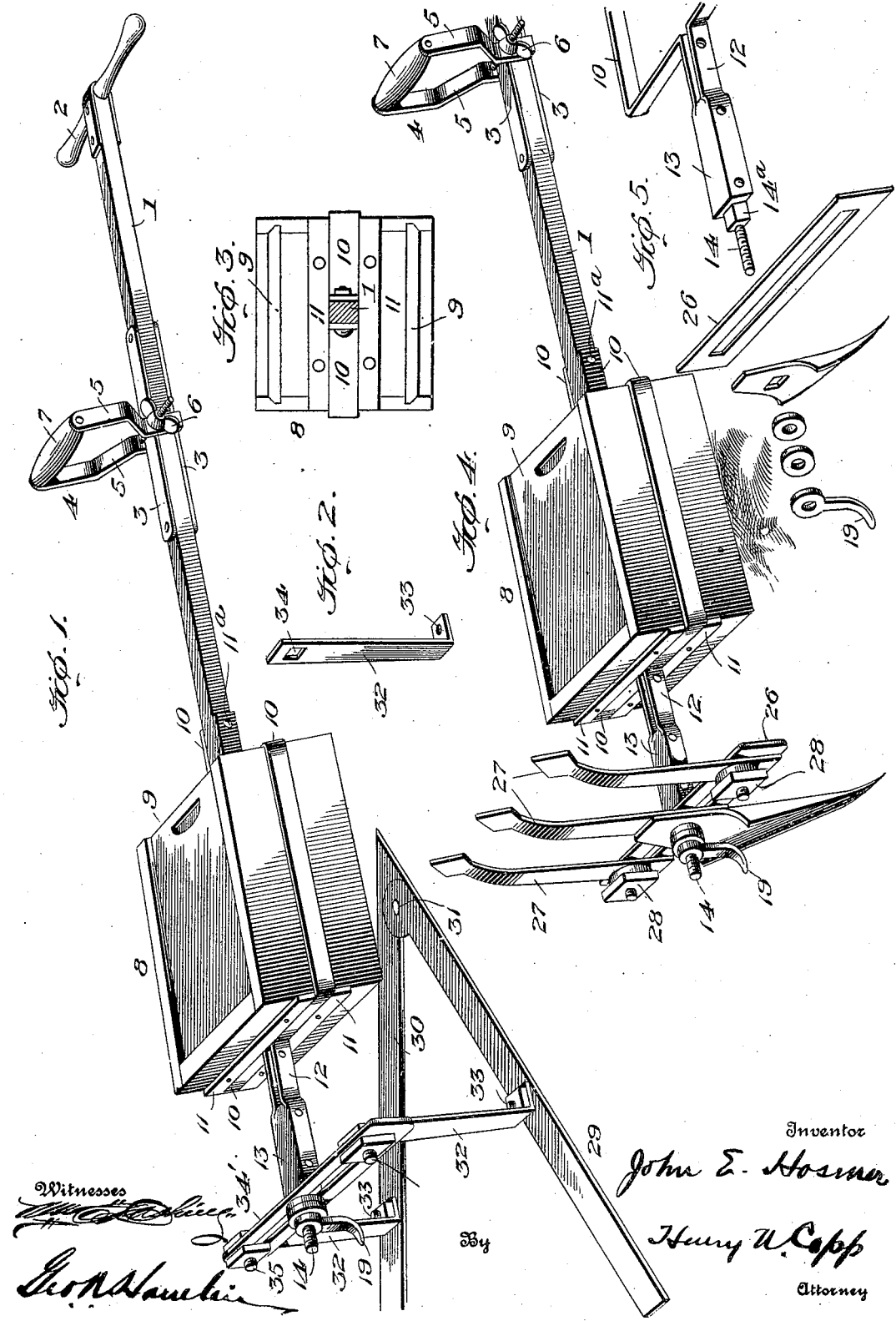
Inventor
John E. Hosmer
Henry U. Capp
Attorney
Witnesses

UNITED STATES PATENT OFFICE.

JOHN E. HOSMER, OF SILVERTON, OREGON.

GRAVITY HAND-CULTIVATOR.

933,986.  Specification of Letters Patent.  Patented Sept. 14, 1909.

Application filed October 22, 1908. Serial No. 459,040.

*To all whom it may concern:*

Be it known that I, JOHN E. HOSMER, a citizen of the United States, residing at Silverton, county of Marion, and State of Oregon, have invented certain new and useful Improvements in Gravity Hand-Cultivators, of which the following is a specification.

This invention relates to gravity hand cultivators.

The object of the present invention is to provide a cultivator adapted for hand use having attachments whereby it may be readily converted into a plow, a cultivator, a weed cutter, or a harrow; a cultivator provided with a novel weight box to receive stones or weights to the desired amount to impart to the implement any desired gravital effect; and, generally, to provide an agricultural implement which can be readily adapted for a variety of uses, will be comparatively inexpensive to manufacture, durable, easy to operate by hand, and efficient in operation.

In the accompanying drawings: Figure 1 is a perspective view of the invention, showing a weed cutter used therewith; Fig. 2, a detail of a standard for the weed cutter; Fig. 3, an end elevation of the weight box, the shank being shown in section; Fig. 4, a perspective view, showing the use of both the harrow and cultivator attachments; and Fig. 5, a detail view of the bands which hold the weight box, and the means for securing the different implements.

Referring first to Figs. 1 and 2, where the implement is shown as adapted for use in connection with a weed-cutter, 1 designates the shank which is square in cross-section so that it will not bend or yield as easily as a round shank and thus will give greater purchase, 2 the handle at the end thereof, 3 wear plates and 4 an adjustable handle, said handle consisting of two side pieces 5 having a certain amount of resiliency, although rigid when clamped on the shank, and an adjusting screw and nut 6 whereby the side pieces are clamped on the shank, said side pieces being bridged by a grip 7.

The arrangement described permits use of the implement by either a right handed or left handed person and the adjustability of the handle permits of the operator suiting his convenience in the matter of hold.

A box or receptacle 8 which has sliding bottoms 9 (Fig. 3) is secured to the shank 1 by bands 10 which encircle it and are held by strips 11, the ends of the bands being secured to the shank 1 at 11$^a$ in one instance and in the other instance extending outwardly from the opposite end of the box at 12 and there provided with a filling piece 13 which is preferably welded thereto or otherwise suitably secured and a screw-threaded extension 14 having a polygonal part 14$^a$. The bottoms 9 can be secured in other ways, the object in that respect being to provide a weight containing box which can be filled or dumped from either side so that in applying the attachments or changing them, the operator does not have to pay attention to the position of the box.

In Fig. 1, there is shown a weed cutter consisting of knives 29 and 30, pivoted at 31 and provided with standards 32 (Fig. 2) secured thereto at 33 and provided with openings 34 in their upper ends which may be adjustably secured to a link 34' by nuts and bolts 35, the link being secured to the part 14$^a$ by the insertion of said part therein and the use of the hand nut 19. The knives may be adjusted toward or away from each other so that a wide or narrow cut may be obtained, as desired.

In Fig. 4 I have illustrated how a cultivator blade and harrow teeth may be used in connection with the shank. A cultivator blade 24 which has a square opening therethrough corresponding to the squared end 14$^a$, has such hole receiving such squared end. A slotted or open link 26 has its slot receiving the squared end 14$^a$, the link and cultivator being clamped by the hand-nut 19. The harrow teeth 27 are adjustably secured to the link 26 so as to be capable of being positioned as close or as far apart as desired, by nuts and bolts 28, the shanks of the bolts passing through the slot of the link 26. The opening in one of the harrow teeth may receive the squared part 14$^a$. With this arrangement of harrow teeth and cultivator blade, either the cultivator or the harrow may be used by simply turning the entire implement upside down.

The implement is adaptable for use with other arrangements of agricultural devices than those which have been specifically described.

In using the implement with any of its attachments it is pulled by the operator and the operation is easy on account of the gravital action exerted by the box and its contained weights which may be varied as found desirable, stones or loose weights of any kind being used and varied according to conditions of operation. By the use of the two bottoms the weights may be increased or diminished without requiring reversal of the implement.

Having thus described my invention, what I claim as new, and desire to secure by Letters Patent, is:—

1. In a gravity hand cultivator, the combination with a shank, and an agricultural implement connected thereto, of an open-ended weight box or receptacle carried by the shank, and movable closures for each end of said weight box, for the purpose set forth.

2. In a gravity hand cultivator, the combination with a shank, and an agricultural implement connected thereto, of an open-ended weight box or receptacle connected to the shank substantially in line with the median plane of said box, and movable closures for each end of said weight box, for the purpose set forth.

3. In a gravity hand cultivator, the combination with a shank having a screw-threaded locking part, of a plate having a slot through which said locking part is adapted to pass, harrow teeth having fastening bolts passing through said slot whereby said teeth may be adjustably positioned as desired, a cultivator blade having an opening through which the locking part passes, and a locking nut on said screw threaded locking part adapted to clamp the cultivator blade and the plate to the handle.

In testimony whereof, I hereunto affix my signature in presence of two witnesses.

JOHN E. HOSMER.

Witnesses:
PERRY BURCH,
M. W. BARKHURST.